(12) United States Patent
Rockwell

(10) Patent No.: US 6,879,067 B1
(45) Date of Patent: Apr. 12, 2005

(54) ORBITAL VIBRATOR

(76) Inventor: Phillips D. Rockwell, 1414-4th St., Berkeley, CA (US) 94710

( * ) Notice: Subject to any disclaimer, the term of this patent is extended or adjusted under 35 U.S.C. 154(b) by 173 days.

(21) Appl. No.: 09/590,797

(22) Filed: Jun. 9, 2000

Related U.S. Application Data

(60) Provisional application No. 60/178,485, filed on Jan. 27, 2000.

(51) Int. Cl.$^7$ .............................................. H02K 33/00
(52) U.S. Cl. .............................. 310/36; 310/81; 310/12
(58) Field of Search ............................. 310/36, 12, 13, 310/14, 17, 40.5, 51, 81, 15, 38; 198/769, 763, 762, 771, 750.1

(56) References Cited

U.S. PATENT DOCUMENTS

| | | |
|---|---|---|
| 2,895,064 A | 7/1959 | Hoff et al. |
| 3,060,334 A | * 10/1962 | Favre ........................... 310/38 |
| 3,581,969 A | 6/1971 | Bodine |
| 3,613,870 A | 10/1971 | Burgess, Jr. |
| 3,623,706 A | 11/1971 | Isaacson |
| 3,637,190 A | 1/1972 | Isaacson |
| 3,643,384 A | 2/1972 | Isaacson et al. |
| 3,838,964 A | 10/1974 | Hake |
| 3,913,895 A | 10/1975 | De Bruyne |
| 3,986,603 A | 10/1976 | Kamner et al. |

(Continued)

OTHER PUBLICATIONS

NZ Series Advanced Multi Head Weighers Brochure, Ischida Co., Ltd., 1998.
CCW–NZ–214W–S/15, Ischida Co., Ltd., 1998.

*Primary Examiner*—Thanh Lam
(74) *Attorney, Agent, or Firm*—James J. Leary; Carol D. Titus

(57) ABSTRACT

An orbital vibrator apparatus has a base mounted on vibration isolation mounts. An armature plate is resiliently mounted to the base by three flexural spring elements. An armature of magnetically attracted material is mounted to the armature plate. A first electromagnet and a second electromagnet are mounted on the base at right angles to one another and in a spaced apart relationship to the armature. A source of single-phase alternating current is connected to the first electromagnet and the second electromagnet by way of a control circuit. The control circuit includes a variable voltage transformer for controlling the voltage of the electric current and a phase shifting circuit. The phase shifting circuit shifts the phase of the alternating current by approximately ninety degrees. The first electromagnet is driven directly from the output of the voltage transformer and the second electromagnet is driven from the output of the phase shifting circuit. The motion that results from the two electromagnets acting on the armature ninety degrees out of phase from each other will be approximately circular. Optionally, the control circuit may also include a mode selector switch for selectively operating the vibration generator in a circular orbital vibratory mode, an elliptical vibratory mode and a reciprocating vibratory mode.

5 Claims, 7 Drawing Sheets

U.S. PATENT DOCUMENTS

| | | | |
|---|---|---|---|
| 4,019,626 A | | 4/1977 | Kamner |
| 4,058,935 A | | 11/1977 | Smilg et al. |
| 4,260,051 A | * | 4/1981 | Burghart .................. 198/760 |
| 4,378,064 A | | 3/1983 | Brown |
| 4,455,501 A | * | 6/1984 | Tojo et al. .................. 310/328 |
| 4,517,500 A | | 5/1985 | Gotal et al. |
| 4,545,509 A | | 10/1985 | Musschoot et al. |
| 4,547,712 A | | 10/1985 | Gotal et al. |
| 4,633,995 A | | 1/1987 | Hamada |
| 4,764,695 A | | 8/1988 | Inoue et al. |
| 4,801,829 A | * | 1/1989 | Baba .................. 310/10 |
| 4,811,887 A | | 3/1989 | King et al. |
| 4,880,106 A | | 11/1989 | Falconer et al. |
| 4,961,491 A | | 10/1990 | Falconer |
| 5,160,393 A | | 11/1992 | Snyder |
| 5,184,716 A | | 2/1993 | Gaines |
| 5,205,395 A | | 4/1993 | Bruno et al. |
| 5,207,310 A | | 5/1993 | Maddocks |
| 5,239,219 A | | 8/1993 | Matsumoto et al. |
| 5,277,744 A | | 1/1994 | Snyder |
| 5,378,951 A | | 1/1995 | Snyder |
| 5,411,378 A | | 5/1995 | Sipin |
| 5,562,242 A | | 10/1996 | Manzo et al. |
| 5,664,664 A | | 9/1997 | Gaines |

* cited by examiner

ORBITAL VIBRATOR

This application claims the benefit of Provisional Application No. 60/178,485, filed Jan. 27, 2000.

FIELD OF THE INVENTION

The present invention relates to an apparatus for generating vibrations, more particularly it relates to an orbital vibrator apparatus for generating orbital vibrations and which is also capable of multimode operation.

BACKGROUND OF THE INVENTION

Vibration generators are used in a great many technical fields for various applications. For example, vibration generators are used in material conveying machinery to encourage flow or settling of powders, granules and thick liquids or slurries. Vibration generators are also used for inducing movement of parts in vibratory bowl feeders and other material conveying machinery. Other applications of vibration generators include material screening or sieving, sanding, material finishing and frictional welding machinery.

Orbital vibrators, which produce a circular or elliptical motion, generally without rotation or angular velocity, are useful for many of these applications. One particular application that benefits from the use of an orbital vibrator is for agitating the distributor cone of a combination weigher. Commonly, orbital vibrators operate by rotating an eccentrically weighted flywheel using an air motor or an electric motor. Eccentric weighted air motors provide good orbital agitation, are adjustable in speed and amplitude and are quick starting and stopping, which are important attributes in this application. However, the speed of rotation and amplitude are highly interdependent, making it very difficult to independently adjust the frequency and amplitude of the orbital motion. In addition, because they are driven by compressed air, they are expensive to run, and they are considered unsanitary in some applications, such as handling of pharmaceuticals and food products. Eccentric weighted electric motors have the advantage that they do not require compressed air to operate. However, speed control requires expensive control circuitry and the motor coasts considerably when turned off, giving poor on-off control. This can be improved by adding a brake to the motor, but this adds considerable expense and adds wear and maintenance parts to the mechanism. Electromagnetic vibration generators are also used in material conveying equipment, such as vibratory bowl feeders, however these are generally rotational or reciprocating vibrators and are not suitable for applications where orbital vibration is required.

Electromagnetic orbital vibrators have been devised for use in other fields. For example, U.S. Pat. Nos. 5,160,393, 5,277,744 and 5,378,951, granted to Snyder, describe a friction welder with an electromagnetic orbital vibrator. The orbital vibrator has three electromagnets arranged around an armature of magnetically attracted material. The three electromagnets are powered by a variable frequency three-phase alternating current source to induce an orbital motion in the armature. A mode selector switch is described, which allows the friction welder to be operated alternatively in an orbital vibratory mode and in a reciprocating vibratory mode. Since this electromagnetic orbital vibrator is configured specifically for use in a friction welder, it is not readily adaptable for use in material conveying equipment and many other applications. Furthermore, the requirement for an additional variable frequency three-phase alternating current source to operate the vibrator mechanism is a significant limitation in the use of this apparatus.

SUMMARY OF THE INVENTION

The present invention takes the form of an orbital vibrator apparatus for generating orbital vibrations and which is also capable of multimode operation. The orbital vibrator apparatus is intended primarily for agitation and transportation of material, typically particulate material. Examples of possible uses include transportation of small to medium-sized parts, such as switches, fasteners, connectors and containers, or transportation of bulk products, such as food products (e.g. nuts, candies, dry pet food, produce, etc.), powder or granular products, such as dry chemicals. The useful range of frequencies for these material transport applications is typically in the range of approximately 0.5 Hz to 150 Hz, with the majority of applications being in the range of approximately 15 Hz to 60 Hz. The useful range of amplitudes is approximately 0.02 to 0.5 inches. Other frequencies and amplitudes may be useful for other applications of the orbital vibrator apparatus.

Generally, the orbital vibrator apparatus has a base mounted on vibration isolation mounts. An armature plate is resiliently mounted to the base by three rods of spring steel, fiberglass or other resilient material that serve as flexural spring elements. An armature of magnetically attracted material is mounted to the armature plate. A plurality of electromagnets, including a first electromagnet and a second electromagnet, are mounted on the base in a spaced apart relationship to the armature. In one particularly preferred embodiment, the first and second electromagnets are mounted at right angles to one another and the armature is made of a first armature bar and a second armature bar, with the first electromagnet mounted in a spaced apart relationship to the first armature bar, and the second electromagnet mounted in a spaced apart relationship to the second armature bar. A source of single-phase alternating current is connected to the first electromagnet and the second electromagnet by way of a control circuit. The control circuit includes a variable voltage transformer for controlling the voltage of the electric current and a phase shifting circuit. The phase shifting circuit shifts the phase of the alternating current by approximately ninety degrees. The first electromagnet is driven directly from the output of the voltage transformer and the second electromagnet is driven from the output of the phase shifting circuit. The motion that results from the two electromagnets acting on the armature ninety degrees out of phase from each other will be approximately circular. Optionally, the control circuit may also include a mode selector switch for selectively operating the vibration generator in a circular orbital vibratory mode, an elliptical vibratory mode and a reciprocating vibratory mode.

The orbital vibrator of the present invention has the advantages of rugged, simple construction and efficient operation. It can be operated with readily available single-phase alternating current and does not require three-phase current. The amplitude is easily controlled and it starts and stops quickly, giving excellent control for material conveying applications. The orbital motion of the vibrator is also easily reversible, which is advantageous in some applications. It operates without compressed air or other potential sources of contamination and is therefore very suitable for handling of pharmaceuticals and food products. The construction of the orbital vibrator makes it readily adaptable for a number of different applications, including material conveying, distributor cone agitation, material screening or sieving, sanding and material finishing machinery.

DETAILED DESCRIPTION OF THE INVENTION

Figure 1:
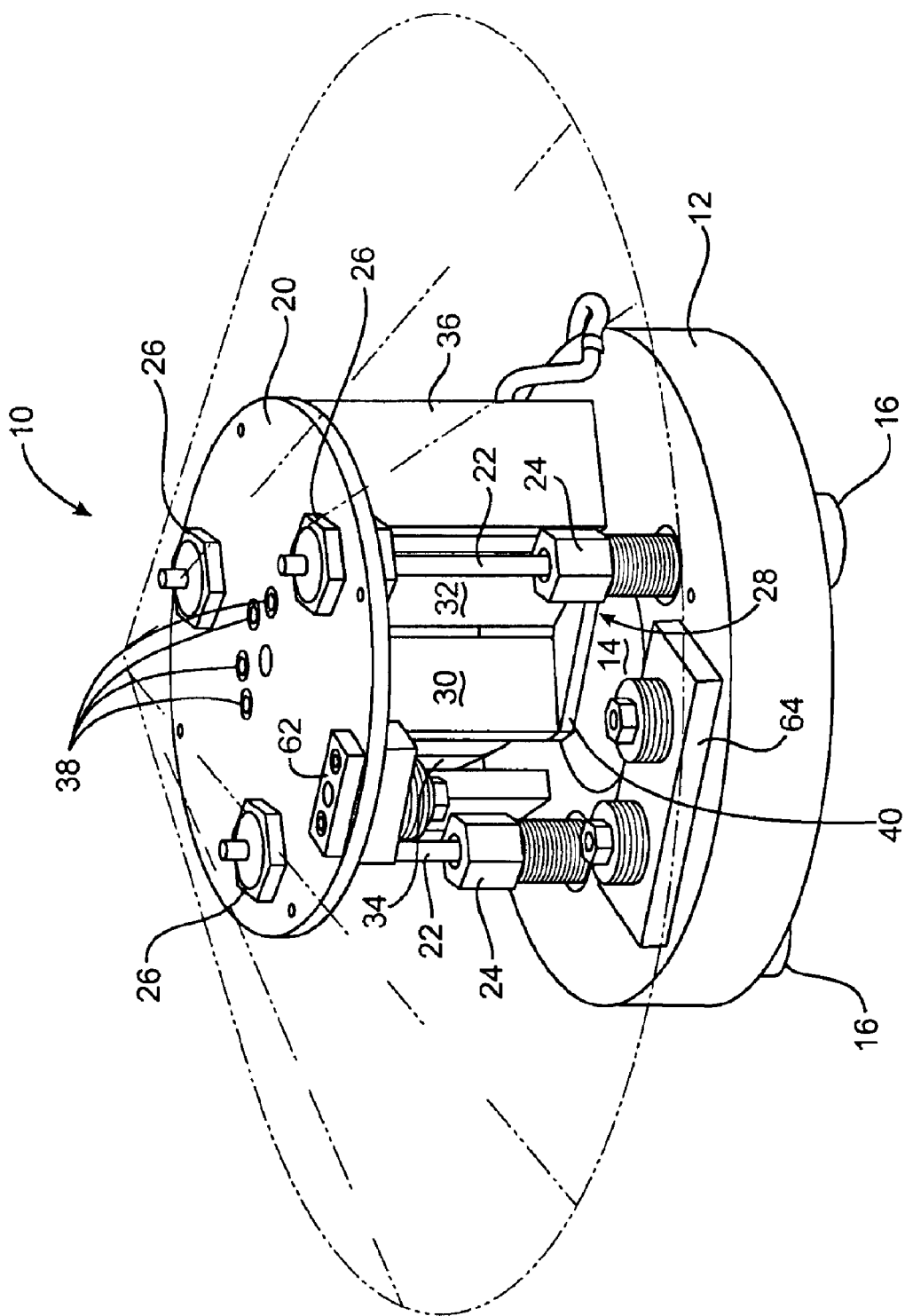
FIG. 1 is a perspective view of an orbital vibrator apparatus constructed according to the present invention.
Figure 2:
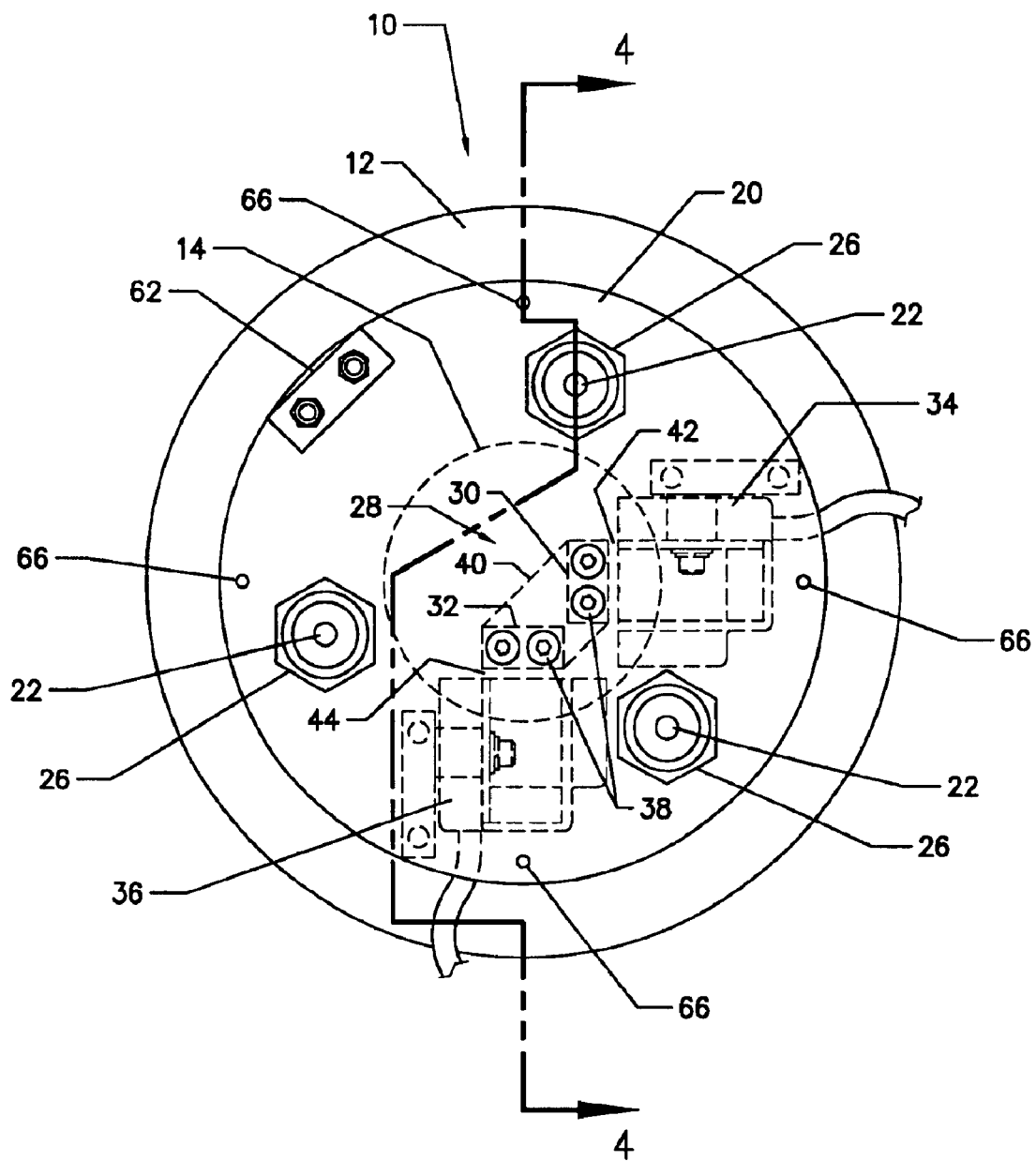
FIG. 2 is a top view of the orbital vibrator.
Figure 3:
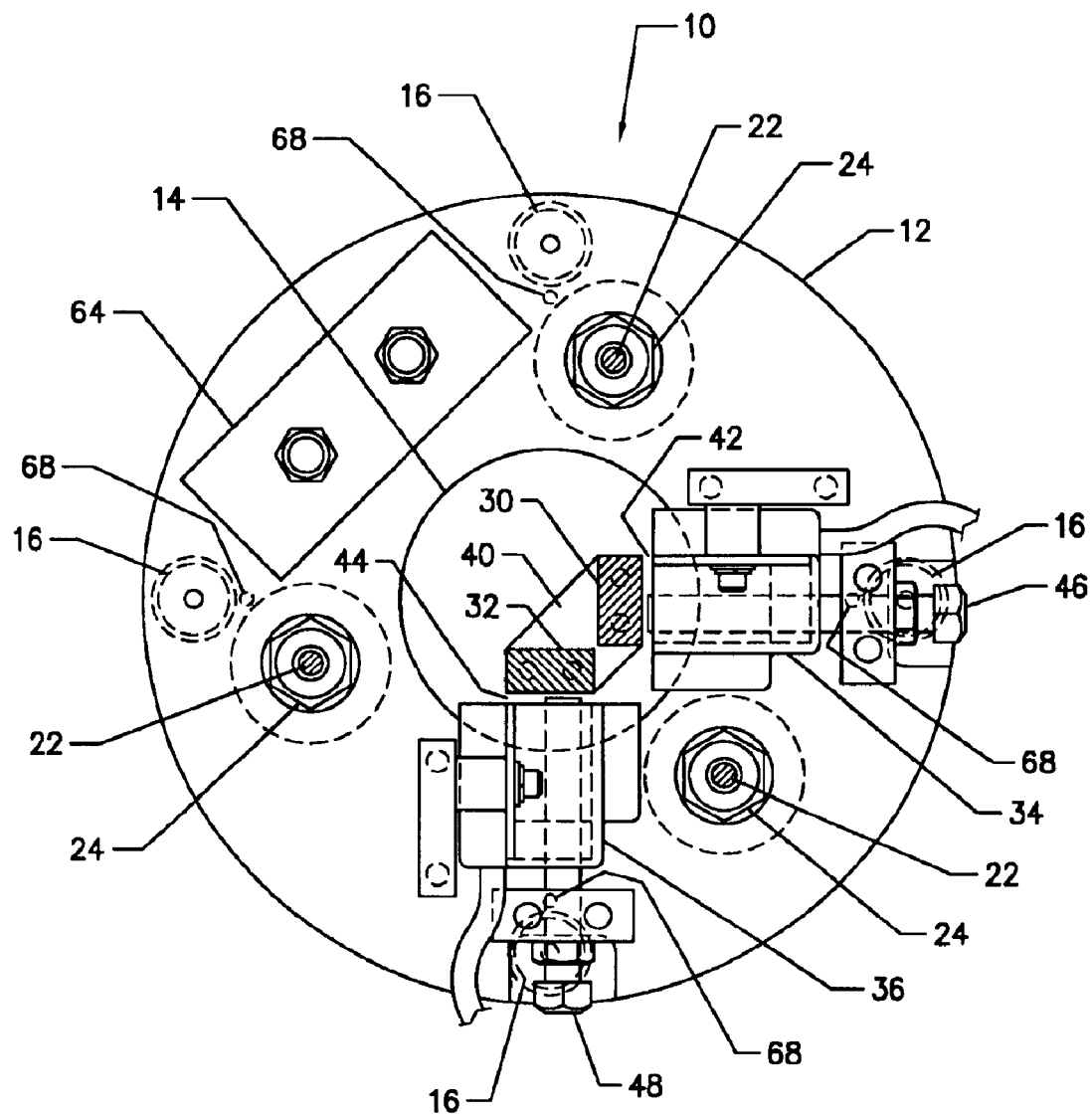
FIG. 3 shows a horizontal cross section of the orbital vibrator taken along line 3—3 in FIG. 4.

FIG. 1 is a perspective view of an orbital vibrator apparatus 10 constructed according to the present invention. FIG. 2 is a top view of the orbital vibrator apparatus 10 taken along line 2—2 in FIG. 4. FIG. 3 shows a horizontal cross section of the orbital vibrator apparatus 10 taken along line 3—3 in FIG. 4. The orbital vibrator apparatus 10 has a base 12, which is constructed of a dense, rigid material, such as steel or cast iron. In a particularly preferred embodiment, the base 12 is in the form of a thick circular plate of steel or cast iron having a hole 14 through the middle of the base to reduce the weight without significantly reducing the moment of inertia. Preferably, the base 12 is mounted on one or more vibration isolation mounts 16, for example viscoelastic polymer vibration isolation mounts or the like. FIG. 3 shows the base 12 mounted on four such vibration isolation mounts 16. Depending on the intended application, the orbital vibrator apparatus 10 may be freestanding, with the vibration isolation mounts 16 serving as feet for the apparatus, or it may be mounted onto a machine 18 or another surface by way of the vibration isolation mounts 16. The vibration isolation mounts 16 provide a degree of damping to the vibrator mechanism, as well as minimizing the vibration transmitted to the machine 18 that the orbital vibrator apparatus 10 is mounted on. In some applications, it may be preferable to mount the orbital vibrator apparatus 10 without vibration isolation mounts 16 or for the base 12 to be free floating, except for its attachment to the orbital vibrator apparatus 10.

An armature plate 20 is resiliently mounted to the base 12 by one or more flexural spring elements 22, which hold the armature plate 20 spaced apart from and approximately parallel to the base 12. The machinery to be vibrated is mounted on or otherwise connected to the armature plate 20. The armature plate 20 is preferably constructed of a rigid, lightweight material, such as aluminum or steel, and may be round, as shown, or any other convenient shape. For example, the armature plate 20 may be made triangular to minimize weight and moment of inertia. The orbital vibrator apparatus 10 is shown in a nominally upright position with the armature plate 20 above the base 12. This orientation will be convenient for many applications, such as agitating a distributor cone, however the orbital vibrator apparatus 10 may be oriented in virtually any position suitable for a given application.

The flexural spring elements 22 may take the form of a multiplicity of rods 22 made of a resilient material and connected between the base 12 and the armature plate 20. In a particularly preferred embodiment, the flexural spring elements 22 take the form of three rods 22 made of spring steel, fiberglass or another resilient material. Rods having a round cross section are preferable for the flexural spring elements 22 because they have the same moment of inertia in all directions, which results in symmetrical flexion of the rods 22 and predictable movement of the armature plate 20. However, in alternate embodiments the rods 22 may have any convenient cross-sectional shape, such as tubular, oval, square, rectangular, triangular, etc. Asymmetrical rods may be used advantageously for imparting non-circular, e.g. elliptical, motion to the armature plate 20.

Figure 4:
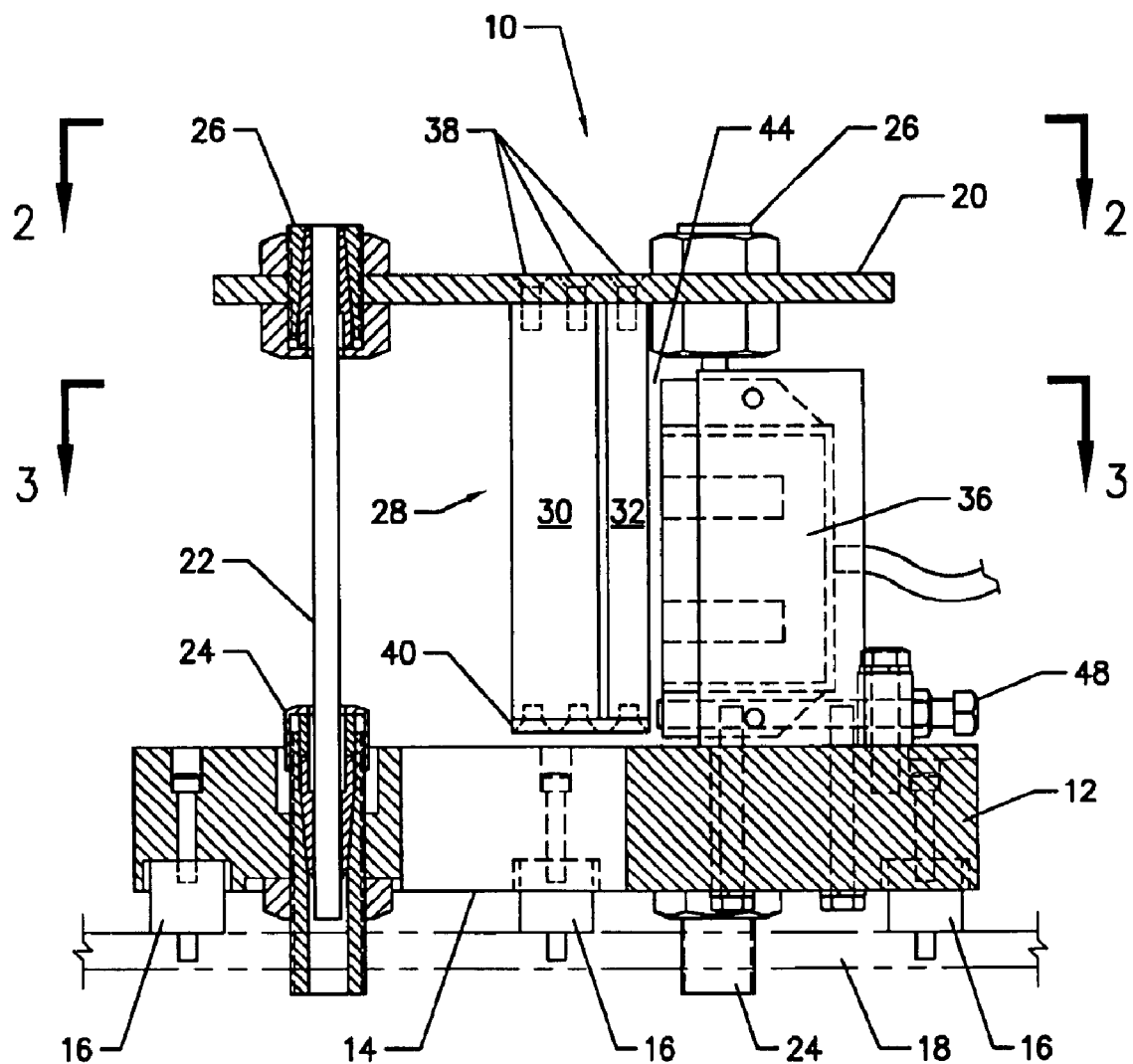
FIG. 4 shows a cutaway side view of the orbital vibrator illustrating some of the internal construction of the apparatus taken along line 4—4 in FIG. 2.

The rods or flexural spring elements 22 may be connected to the base 12 and to the armature plate 20 in any convenient manner that does not interfere with their flexion and is capable of withstanding vibration without undue fatigue. The cutaway side view of the orbital vibrator apparatus 10 in FIG. 4 shows one possible means for connecting the rods 22 to the base 12 and to the armature plate 20. Each of the rods is mounted to the base 12 with a first collet clamp 24 and to the armature plate 20 with a second collet clamp 26. The collet clamps 24, 26 are similar to those used on machine tools, such as lathes and mills. This arrangement allows individual adjustment of the length of each of the rods 22 for leveling the armature plate 20 and balancing the spring rates of the rods 22. It also provides adjustment of the total spring rate by shortening or lengthening all of the rods 22. Adjusting the total spring rate allows the user to tune the resonant frequency of the vibrator mechanism if necessary. These attributes are desirable in an experimental laboratory model of the orbital vibrator 10, where adjustments may be necessary for adapting to different applications or load conditions. In a commercial industrial model intended for a known application and known load conditions the adjustability may be unnecessary. Matched rods 22 of fixed length with a simpler, nonadjustable attachment means may be preferred for the sake of cost savings.

An armature 28 of magnetically attracted material is mounted to the armature plate 20. The armature 28 may be made of steel, iron or any other magnetically attracted material. Alternatively, the armature 28 may be made of material that is permanently magnetized. These options will be discussed in more detail in the operational description below. With the orbital vibrator apparatus 10 in a nominally upright position, the armature 28 will be suspended downward toward the base 12. The armature 28 may be made of one solid piece of magnetically attracted material, or it may be made up of two or more separate armature bars.

A plurality of electromagnets, including a first electromagnet 34 and a second electromagnet 36, are mounted on the base 12 in a spaced apart relationship to the armature 28. The electromagnets 34 and 36 are typically of conventional laminated core construction. In one particularly preferred embodiment, the first electromagnet 34 and the second electromagnet 36 are mounted at right angles to one another, and the armature 28 is made of a first armature bar 30 and a second armature bar 32, also mounted at right angles to one another. Each of the armature bars 30, 32 is fastened on the upper end to the armature plate 20, for example by machine screws 38. A bridging plate 40 attaches the lower ends of the armature bars 30, 32 to one another to rigidify the armature 28 so that it acts as a single unit. This arrangement lowers the weight of the armature 28, compared to making it out of one solid piece of magnetically attracted material, and provides more space for mounting the electromagnets, 34, 36 so that they do not physically interfere with one another.

The first electromagnet 34 is mounted in a spaced apart relationship to the first armature bar 30, leaving a first air gap 42 between the first electromagnet 34 and the first armature bar 30. The second electromagnet 36 is mounted in a spaced apart relationship to the second armature bar 32, leaving a second air gap 44 between the second electromagnet 36 and the second armature bar 32. For tuning the vibrator mechanism, the first air gap 42 may be made adjustable by moving the first electromagnet 34 with respect to the first armature bar 30 and the second air gap 44 may be made adjusted by moving the second electromagnet 36 with respect to the second armature bar 32. A first adjustable stop screw 46 is provided for preventing the first armature bar 30 from striking the first electromagnet 34 and a second adjustable stop screw 48 is provided for preventing the second armature bar 32 from striking the second electromagnet 36. Once again, these attributes are desirable in an experimental laboratory model of the orbital vibrator 10, where adjustments may be necessary for adapting to different applications or load conditions. In a commercial industrial model intended for a known application and known load conditions such adjustability may be unnecessary. In some applications, the stop screws 46, 48 may be eliminated entirely.

Figure 5:
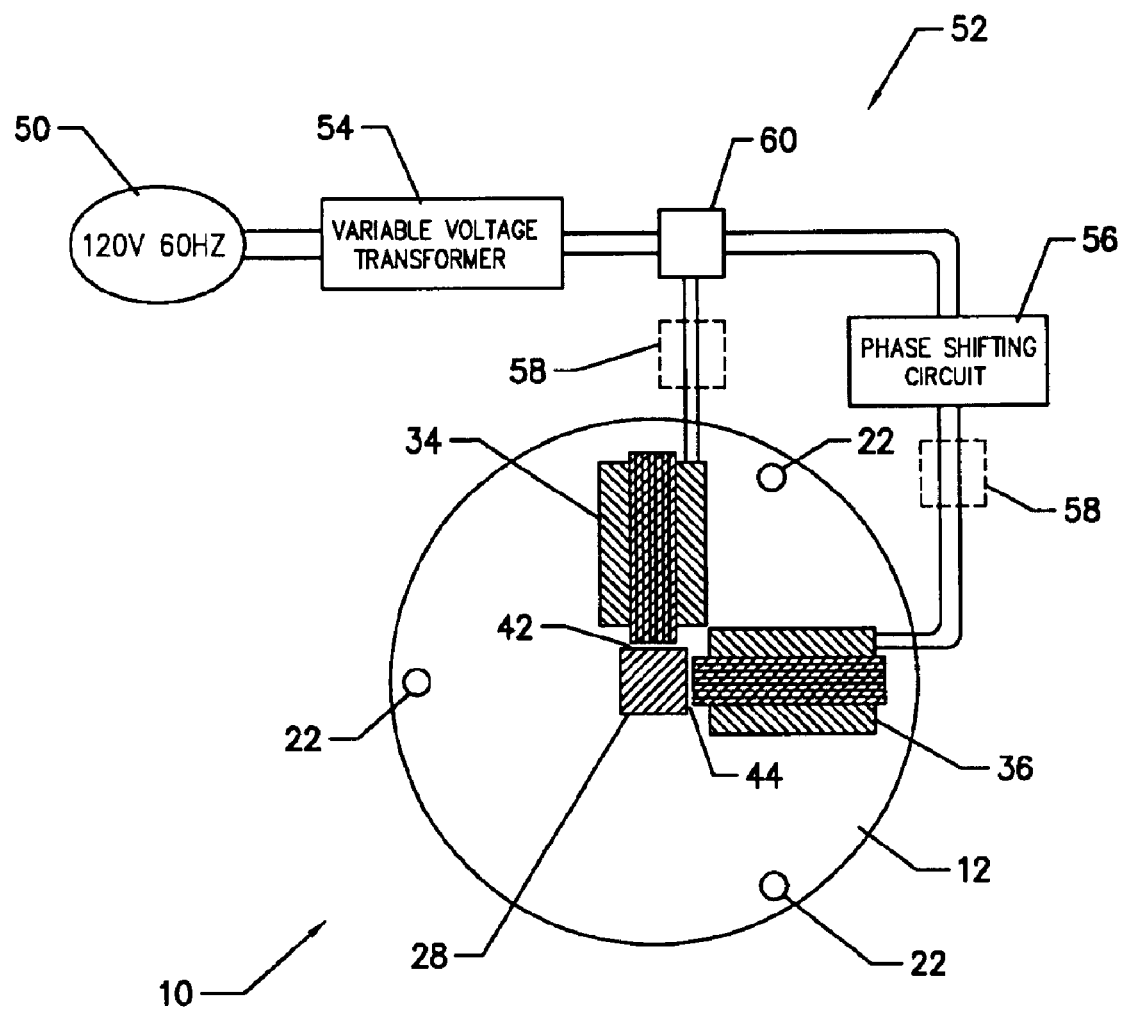
FIG. 5 is a schematic circuit diagram of the orbital vibrator.

A source 50 of single-phase alternating current is connected to the first electromagnet 34 and the second electromagnet 36 by way of a control circuit 52, as shown in the schematic circuit diagram in FIG. 5. Typically, the source 50 of single phase alternating current would be normal line current of 110–240 volts and 50–60 Hz. Alternatively, a variable voltage and/or frequency current source may be used, especially for experimental or laboratory applications. The control circuit 52 includes a variable voltage transformer 54 for controlling the amplitude of the voltage of the electric current and a phase shifting circuit 56. The phase shifting circuit 56 includes a capacitor and a resistor, whose values are chosen to shift the phase of the alternating current by a predetermined amount, or equivalent circuitry for shifting the phase of the alternating current. Preferably, for producing circular motion, the phase shifting circuit 56 shifts the phase of the alternating current by an amount approximately equal to the angular separation between the first electromagnet 34 and the second electromagnet 36. In the embodiment illustrated, the phase shifting circuit 56 shifts the phase of the alternating current by approximately ninety degrees, corresponding to the ninety-degree angle between the first electromagnet 34 and the second electromagnet 36. The phase shifting circuit 56 may be made adjustable for fine-tuning the vibrator mechanism and to account for physical variations in the construction of the orbital vibrator apparatus 10. In applications where noncircular orbital motion, such as elliptical or angled linear motion, is called for, the phase shift angle may be different from the angle between the first electromagnet 34 and the second electromagnet 36.

Optionally, the control circuit 52 may also include a rectifier 58, either a half-wave rectifier, e.g. a diode, or a full-wave rectifier, e.g. a diode bridge. Alternatively, the optional rectifier 58 may be incorporated into each of the electromagnets 34 and 36. When used with a magnetically attracted armature 28, a half-wave rectifier would result in a vibration frequency equal to the nominal line frequency and a full-wave rectifier would result in a vibration frequency equal to twice the nominal line frequency.

The first electromagnet 34 is driven directly from the output of the voltage transformer 54 and the second electromagnet 36 is driven from the output of the phase shifting circuit 56. The motion that results from the two electromagnets 34, 36 acting on the armature 28 ninety degrees out of phase from each other will be approximately circular. The orbital motion of the armature 28 will be transferred through the armature plate 20 to any piece of machinery mounted on or connected to the armature plate 20. The amplitude of the orbital motion of the armature 28 is adjusted by voltage of the alternating current with the variable voltage transformer 54 of the control circuit 52.

The armature 28 may be made of one solid piece of magnetically attracted material, or it may be made up of two or more separate armature bars. If the armature 28 is made of a magnetically attracted material that is not permanently magnetized and the alternating current is half-wave rectified, the orbital motion of the armature 28 will have a frequency equal to the frequency of the driving current. If the armature 28 is made of a magnetically attracted material that is not permanently magnetized and the alternating current is either full-wave rectified or not rectified at all, the orbital motion of the armature 28 will have a frequency that is twice the frequency of the driving current because the armature 28 will be attracted by the electromagnets on both the positive and negative pulses of the alternating current. On the other hand, if the armature 28 is made of a permanently magnetized material and the alternating current is not rectified, the orbital motion of the armature 28 will have a frequency equal to the frequency of the driving current because the armature 28 will be alternately attracted and repulsed by the electromagnets as they change polarity with the alternating current. This feature can be used advantageously to select the operating frequency of the orbital vibrator 10.

For efficiency, the armature 28 is preferably driven at a frequency that is close to the resonant frequency of the vibrator mechanism, which is determined by the spring-mass system consisting of the flexural spring elements 22, the armature plate 20, the armature 28, the base 12 and any contribution from the operating load. In an experimental or laboratory model, the frequency of the alternating current can be changed to correspond to the resonant frequency of the vibrator mechanism. Alternatively, the mass and the spring constants could be selected so that the resonant frequency of the vibrator mechanism is approximately equal to the frequency of the driving current or twice the frequency of the driving current, depending on the material of the armature 28.

Additional electromagnets may be used in alternate embodiments of the orbital vibrator apparatus 10. For example, the orbital vibrator apparatus 10 could be operated in a push-pull mode by using four electromagnets place ninety degrees apart and using a permanently magnetized armature 28. For producing circular motion, the phase shift for each of the four magnets would be approximately 0, 90, 180, and 270 degrees, respectively. Only one phase shifting circuit 56 would be required to accomplish this because opposing pairs of magnets could be driven 180 degrees out of phase with one another by connecting them together in reverse polarity.

Additionally or alternatively one electromagnet or a pair of electromagnets may be placed in a vertically spaced apart position with respect to the armature 28 in order to induce vertical movement or vibrations of the armature 28. The armature mounting assembly could be modified to provide a desired spring rate in the vertical direction. The vertical movement or vibrations of the armature 28 may be in or out of phase with the horizontal vibrations and at the same or a different frequency as desired or in keeping with a particular application of the orbital vibrator 10.

The damping of the orbital vibrator apparatus 10 provided by the vibration isolation mounts 16 flattens the frequency response of the vibrator mechanism to stabilize it as it operates near its resonant frequency and to make it more tolerant of changes in mass or operating load. It also tends to linearize the voltage/amplitude response of the orbital vibrator apparatus 10. Additionally or alternatively, damping can be added to the orbital vibrator apparatus 10 at other points in the vibrator mechanism. For example, the flexural spring elements 22 may be made of a lossy material and/or damping material can be added where they attach to the base 12 and the armature plate 20. In addition, some vibrational damping may be contributed by the operating load. Variable damping can be provided by adjustable vibration isolation mounts. This feature may be advantageous when the damping contribution from the operating load is variable.

The orbital vibrator apparatus 10 may be modified to operate in other vibratory modes. As mentioned above, the geometry of the flexural spring elements 22 can be used to induce noncircular vibrations in the vibrator apparatus 10. Likewise, noncircular vibrations can be induced by mismatching the strength and/or altering the timing relationships of the electromagnets 34 and 36. The vibrator apparatus 10 may also be controlled electrically to operate in different vibratory modes. A mode selector switch 60 or the like may be added to the control circuit for selectively operating the vibrator apparatus 10 in a circular orbital vibratory mode, an elliptical vibratory mode and a reciprocating vibratory mode. The operation of the circular orbital vibratory mode has been described above. To operate the vibrator apparatus 10 in a reciprocating vibratory mode, the mode selector switch 60 connects the circuit so that only one of the electromagnets 34 or 36 is driven by the alternating current source 50. Alternatively, the mode selector switch 60 can bypass the phase shifting circuit 56 so that both of the electromagnets 34 and 36 are driven in phase with one another. To operate the vibrator apparatus 10 in an elliptical vibratory mode, the mode selector switch 60 connects the circuit in such a way that one of the electromagnets 34 or 36 is driven with a higher driving voltage that the other. The resulting motion of the armature 28 is elliptical. This can be accomplished with a second voltage transformer or with a simple resistance load or variable resistor on one branch of the circuit. Also, linear motion in any direction and elliptical motion in any axis ratio and any axis direction is possible using the correct combination of timing and amplitude. Other vibratory modes are also possible.

The mode selector switch 60 can be used advantageously for selectively vibrating the orbital vibrator apparatus 10 in a desired mode to affect the distribution of product in a distributor or combination weigher. For example, in a combination weigher, if it is found that product is being unevenly distributed by the distributor cone, the orbital vibrator apparatus 10 can be continuously or intermittently operated in an elliptical or reciprocating mode to balance the product distribution. On the other hand, if an uneven distribution is desired, the orbital vibrator apparatus 10 can be operated in an elliptical or reciprocating mode to achieve the desired product distribution. Selective product distribution may also be achieved in a distributor having two or more product discharge chutes that are at a selected angle with respect to one another. The orbital vibrator apparatus 10 can be selectively operated in different reciprocating modes to encourage product to discharge from one or the other of the discharge chutes. The component of the vibration parallel to a discharge chute will increase the flow of product through the discharge chute, whereas the component of the vibration orthogonal to the discharge chute will have less effect on the flow rate through the discharge chute. Thus, by selecting the vibratory mode, the flow of product from the discharge chutes can be balanced or can be adjusted to a desired discharge ratio.

The orbital vibrator apparatus 10 is preferably balanced for smooth and predictable operation. As mentioned above, the spring forces of the rods 22 should be balanced, either by providing a means for adjustment or by manufacturing matched rods 22 to within acceptable manufacturing tolerances. The multiplicity of rods 22 are preferably arranged in a regular polygon about the center of moment of the orbital vibrator apparatus 10, so that the total spring force is equal in all directions. For example, it can be seen from FIGS. 2 and 3 that the three rods 22 in this illustrative embodiment are arranged in an equilateral triangle centered about the center of the armature plate 20 and the base 12. Likewise, if four rods 22 were used, they would preferably be arranged in a square, five rods 22 would be arranged in a regular pentagon, etc. In addition, the moment of inertia of the armature plate 20 combined with the armature 28 should be balanced about the center of the orbital vibrator apparatus 10, and the moment of inertia of the base 12 combined with electromagnets 34 and 36 should also be balanced about the center of the orbital vibrator apparatus 10. The armature plate 20 and the base 12 may be constructed with balance dimples 66, 68 to assist in balancing the orbital vibrator apparatus 10. The balance dimples 66, 68 are shallow holes formed in the respective armature plate 20 and the base 12 at four positions ninety degrees apart. After assembly with its related components, each of the armature plate 20 and the base 12 is individually placed on a balancing fixture that includes two vertical pointed rods. The armature plate 20 and base 12 assemblies are balanced about a first axis, then rotated ninety degrees and balanced about a second axis. If needed, an armature balancing weight 62 and a base balancing weight 64 may be added to the armature plate 20 and the base 12 for achieving the proper balance. The electromagnets 34 and 36 should preferably be arranged along radial lines so that the force vectors between each of the electromagnets 34 and 36 and the armature 28 pass through the center of the orbital vibrator apparatus 10. Balanced in this way, the orbital vibrator apparatus 10 will produce an almost purely orbital or reciprocating vibratory motion, with little or no rotational component to the vibration, which is desirable for many applications. It is foreseen, however, that there may be applications in which it is desirable to generate create a vibratory mode with some rotational component to it. To achieve this, any one or a combination of the balancing components just described may be deliberately made out of balance to induce a combined orbital or reciprocating vibration with an added rotational component.

Various control schemes can be used for controlling the operation of the orbital vibrator 10. A basic control scheme is described above in connection with the control circuit 52 shown schematically in FIG. 5. This basic control scheme will be sufficient for many industrial applications, however, it is limited in the range of operating frequency, phase angle and duty cycle that it can provide. Alternate control schemes can be implemented to provide more variability and greater control over frequency, phase angle and duty cycle.

Figure 6:
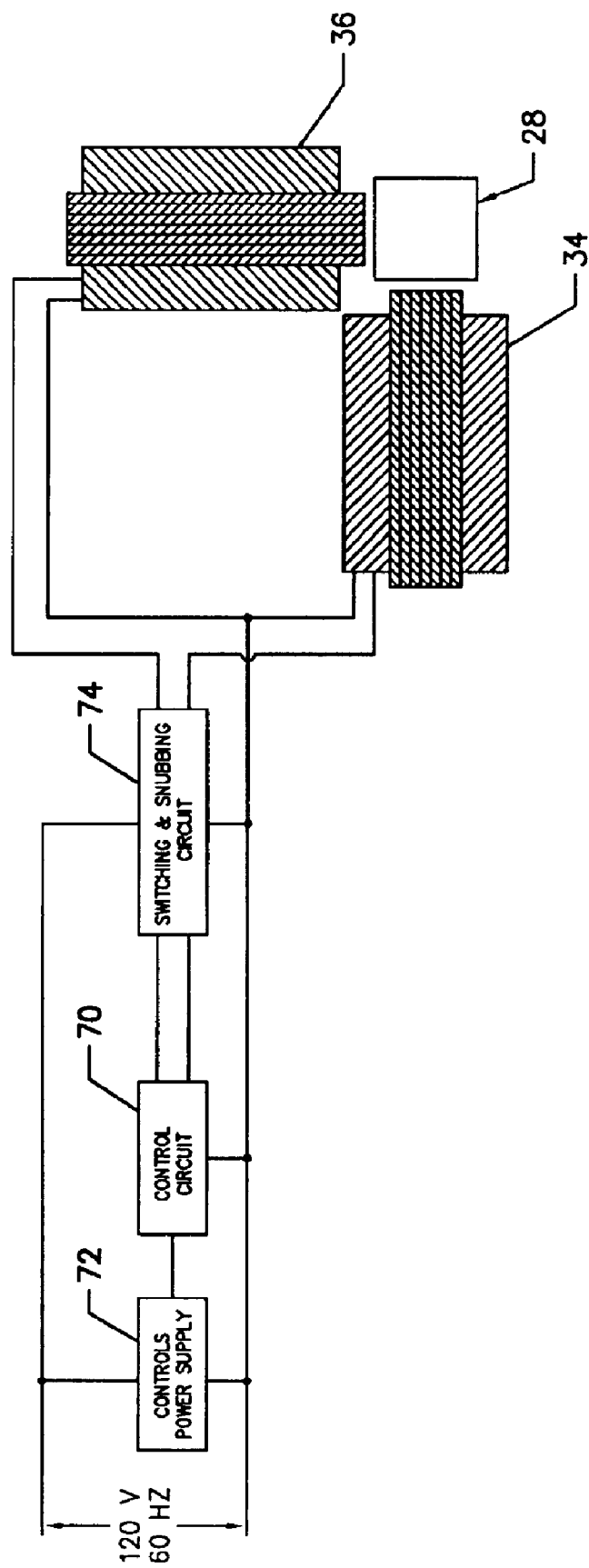
FIG. 6 is a schematic circuit diagram of an alternate control scheme of the orbital vibrator.

FIG. 6 is a schematic circuit diagram of an alternate control scheme of the orbital vibrator. This approach is intended for applications where precise variability of the vibrational frequency is not required. A selectively variable operating frequency is provided by dividing the standard 60 Hz line frequency by small integers to provide frequencies of 30, 20, 15, 10 Hz, etc. Alternatively, the line frequency can be doubled using full-wave rectification, and then divided, to provide additional frequencies. These lower frequencies will cover a large range of industrial applications. They also have the advantages that they will couple better with some loads and will require less driving energy than 60 Hz. Electronics in the control circuit 70 can be used to count and divide the line frequency and to connect the coils of the electromagnets 34, 36 of the orbital vibrator 10 to the line after a prescribed delay after the beginning of a line pulse. The coils of the electromagnets 34, 36 would be automatically disconnected from the line at the point when the current drops to zero. Amplitude would be controlled by varying the delay before turn-on. This approach has the limitation that the per-cycle "on-time" of the coil is limited to about one half-period of the line waveform. This will give low duty cycles for low frequency. A half-wave rectified waveform has a duty cycle of about 32%. Lower frequencies will operate at lower duty cycles. For example, operating at 30 Hz (derived by dividing 60 Hz by 2), the duty cycle will be limited to half of the 60 Hz duty cycle, or approximately 16%. Due to the lower power requirements of lower frequency operation, this should not be a serious limitation for many applications down to approximately 7.5 Hz. Below 7.5 Hz, the duty cycle limitation would become a serious limitation on the operating power of the orbital vibrator 10. This approach has the added limitation that control of the phase relationship is limited to what exists in the line. For example, 30, 15 and 7.5 Hz would be available in 90-degree phase relationships. These frequencies will cover a large range of industrial applications, and the 90-degree phase angle would be the most-used phase angle. The big advantage of this approach is the small number of power handling components needed in the circuit. On the power end, only small switching devices, such as IGBT's, transistors or triacs would be needed, and, optionally, snubbing components 74, such as resistors and diodes. No power supply would be required except for a very small power supply 72 to operate the electronics.

For applications where more precise variability of the frequency, phase angle and duty cycle are required, there are at least three other approaches:

(b) DC power supply and crystal-based timing.

(c) DC power supply and R-C based timing.

(d) DC power supply and microprocessor based timing.

Figure 7:
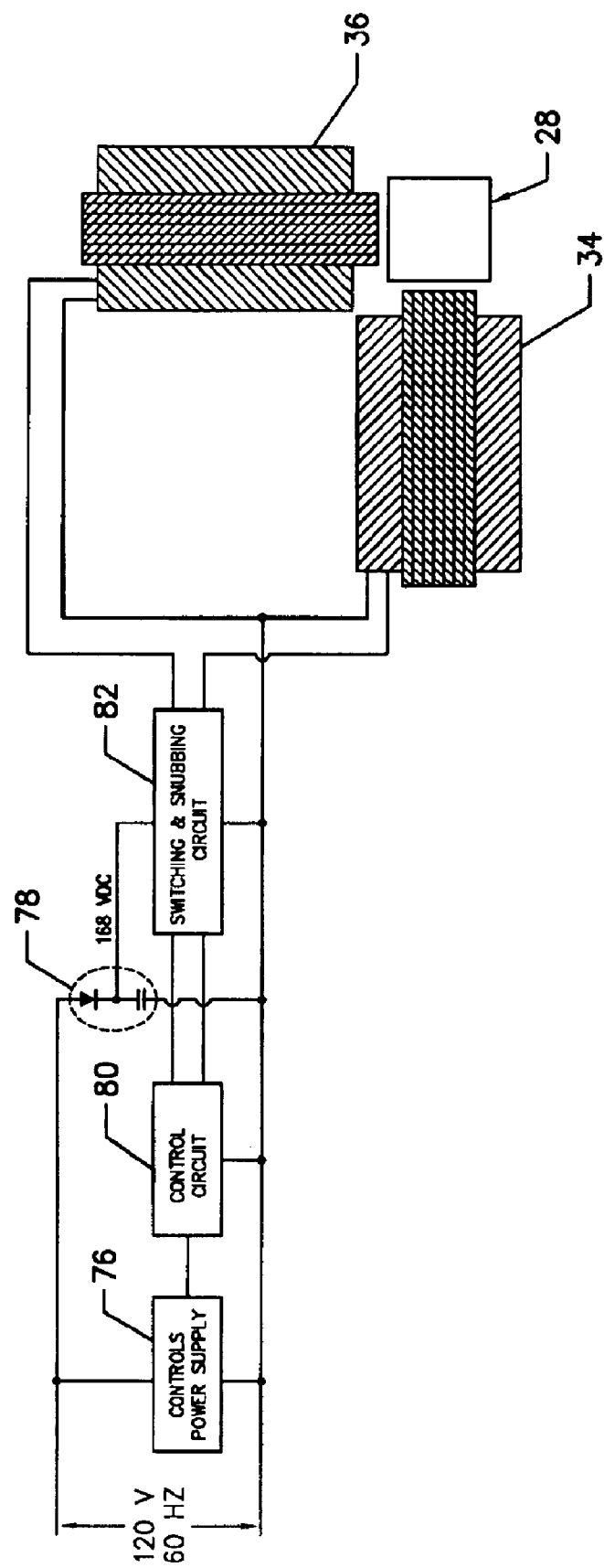
FIG. 7 is a schematic circuit diagram of an alternate control scheme of the orbital vibrator.

These alternate control schemes will be described in connection with the schematic circuit diagram shown in FIG. 7. Each of these three control schemes would require only a small regulated power supply 76 for controls and a simple, lower cost unregulated power supply 78, consisting of only a diode and a capacitor, for power to the electromagnets 34, 36, and, optionally, snubbing components 82.

(b) The crystal-based approach would start with a high-frequency crystal oscillator (preferably 20 MHz or more) whose frequency gets divided down electronically. Frequency, duty cycle and phase angle would be selected by the user by means of thumbwheel switches, keypad, digital interface or other electronic means. The control circuit 80 would interpret the input values and divide the crystal frequency as required. In typical applications, phase angle would be controlled in increments of one degree from 0 to 180 degrees, and duty cycle would be controlled in increments of one percent from 0 to 50 percent. (A phase angle relationship of greater than 180 degrees is equivalent to a phase angle relationship of less than 180 degrees in the opposite direction. It is easier to provide reversing capability than to provide 360-degree phase angle control. Similarly, duty cycles of greater than 50 percent will actually result in less output than 50 percent, because for more than 50 percent of the time the armature is not allowed to move freely.) The controls would, at the appropriate times, connect the various electromagnet coils to the DC power supply by means of switching devices, as described above in control scheme (a). The mathematics of the control scheme yield very fine increments of frequency control at low output frequencies and coarser control at higher output frequencies. The advantage of the crystal-based approach is the inherent stability of crystal timing and digital control, as well as having frequency, duty cycle and phase angle controllable independently of each other. The limitations of frequency, duty cycle and phase angle selectability could be problematic for very demanding applications. These limitations can be mitigated by going to very high (hundreds of MHz) crystal frequencies, which would increase the cost of the control system.

(c) The R-C approach would be similar in concept to the crystal approach in the control of the duty cycle and phase angle and the control increments for these variables would be similar to those in the crystal approach. Frequency, however, would be truly continuously adjustable. Frequency generation would begin with an R-C oscillator running at 1,800 times operating frequency. (1,800 is the smallest number into which both 100 and 360 can be divided an integral number of times –100 because of one percent duty cycle increments, and 360 because of one-degree phase angle increments.) Frequency would be adjustable by varying the resistor in the R-C oscillator. Finer increments in duty cycle and phase control can be obtained by increasing the master frequency oscillator accordingly. (i.e. the master frequency oscillator would run at more than 1,800 times the operating frequency.) The one drawback to this approach is that capacitors are not as stable as crystals.

(d) Microprocessor based timing would ultimately be based upon a crystal as in control scheme (b), however, the user inputs and generation of pulse signals would be facilitated by software. The controls would include a numeric keypad, several controls keys and a small display. The user would input control parameters via the keys, and they would be shown on the display. The microprocessor could also be used to interface with other controls and could accept parameters from another system, and could report status of the vibrator controls to another system. This control scheme would be by far the most powerful and flexible, and the hardware would probably be similar in cost to control schemes (b) and (c) above. The only drawback to this control scheme would be the cost of developing software. This is not a serious drawback, because the software development would be a non-recurring expense, and would be amortized over many units. Occasional minor software revisions would be expected, but these should not be great expenses.

While the present invention has been described herein with respect to the exemplary embodiments and the best mode for practicing the invention, it will be apparent to one of ordinary skill in the art that many modifications, improvements and subcombinations of the various embodiments, adaptations and variations can be made to the invention without departing from the spirit and scope thereof.

I claim:

1. A vibrator apparatus comprising:

a base;

an armature plate resiliently mounted to said base;

an armature of magnetically attracted material mounted to said armature plate;

a plurality of electromagnets, including a first electromagnet and a second electromagnet, said first electromagnet mounted to said base in a spaced apart relationship to said armature, and said second electromagnet mounted to said base in a spaced apart relationship to said armature; and a source of alternating current connected to said first electromagnet and to an input of a phase shifting circuit, an output of said phase shifting circuit being connected to said second electromagnet, wherein said first electromagnet is mounted at a mounting angle with respect to said second electromagnet and said phase shifting circuit phase shifts the alternating current from said source of alternating current by a phase shift angle approximately equal to said mounting angle.

2. A vibrator apparatus comprising:

a base;

an armature plate resiliently mounted to said base;

an armature of magnetically attracted material mounted to said armature plate:

a plurality of electromagnets, including a first electromagnet and a second electromagnet, said first electromagnet mounted to said base in a spaced apart relationship to said armature, and said second electromagnet mounted to said base in a spaced apart relationship to said armature; and a source of alternating current connected to said first electromagnet and to an input of a phase shifting circuit an output of said phase shifting circuit being connected to said second electromagnet, wherein said first electromagnet is mounted at approximately a right angle to said second electromagnet, and said phase shifting circuit phase shifts the alternating current from said source of alternating current by a phase shift angle of approximately ninety degrees.

3. A vibrator apparatus comprising:

a base;

an armature plate resiliently mounted to said base;

an armature of magnetically attracted material mounted to said armature plate;

a plurality of electromagnets, including a first electromagnet and a second electromagnet, said first electromagnet mounted to said base in a spaced apart relationship to said armature, and said second electromagnet mounted to said base in a spaced apart relationship to said armature;

a source of alternating current connected to said first electromagnet and to an input of a phase shifting circuit, an output of said phase shifting circuit being connected to said second electromagnet, and a variable voltage transformer connected to said source of alternating current.

4. A vibrator apparatus comprising:

a base;

an armature plate resiliently mounted to said base;

an armature of magnetically attracted material mounted to said armature plate, said armature being permanently magnetized;

a plurality of electromagnets, including a first electromagnet and a second electromagnet, said first electromagnet mounted to said base in a spaced apart relationship to said armature, and said second electromagnet mounted to said base in a spaced apart relationship to said armature; and a source of alternating current connected to said first electromagnet and to an input of a phase shifting circuit, an output of said phase shifting circuit being connected to said second electromagnet.

5. The vibrator apparatus of claim 1, wherein said circuit comprises a mode selector switch for selectively operating the vibration generator in a circular orbital vibratory mode, an elliptical vibratory mode and a reciprocating vibratory mode.

* * * * *